United States Patent [19]

Sweet

[11] Patent Number: 5,461,090
[45] Date of Patent: Oct. 24, 1995

[54] AQUEOUS, ESSENTIALLY VOC-FREE ADHESIVE EPOXY PRIMER

[75] Inventor: David E. Sweet, Midland, Mich.

[73] Assignee: Cytec Technology Corp., Wilmington, Del.

[21] Appl. No.: 130,229

[22] Filed: Oct. 1, 1993

Related U.S. Application Data

[63] Continuation of Ser. No. 944,570, Sep. 14, 1992, abandoned.

[51] Int. Cl.$^6$ .............................. C08K 3/20; C08L 63/02; C08L 63/04
[52] U.S. Cl. ........................ 523/404; 523/428; 525/523; 525/524; 528/103
[58] Field of Search .................................. 523/404, 428; 525/523, 524; 528/103

[56] References Cited

U.S. PATENT DOCUMENTS

| | | | |
|---|---|---|---|
| 2,872,427 | 2/1959 | Shroeder | 260/29.2 |
| 4,482,660 | 11/1984 | Tsuyoshi et al. | 523/428 |
| 4,607,069 | 8/1986 | Tesch et al. | 523/400 |
| 4,855,386 | 8/1989 | Bauer | 528/117 |
| 5,001,173 | 3/1991 | Anderson | 523/406 |
| 5,118,729 | 6/1992 | Piechocki | 523/404 |

FOREIGN PATENT DOCUMENTS

| | | |
|---|---|---|
| 39674 | 6/1973 | Australia. |
| 0060581 | 9/1982 | European Pat. Off.. |
| 0170075 | 2/1986 | European Pat. Off.. |
| 2519639 | 7/1983 | France. |
| 2622410 | 11/1976 | Germany.. |
| 84/02711 | 7/1984 | WIPO. |

OTHER PUBLICATIONS

Adhesives Age, Dec. 1991, pp. 24–26.
Lee & Neville, Handbook of Epoxy Resins, 1967, pp. 4–61.
Polymers Paint Colour Journal—Oct. 17, 1990 vol. 180 No. 4270 Guidelines To Formulation of Waterborne Epoxy Primers.
Modern Plastics, 1959, pp. 83 and 84 Emulsions—Why and How They are Used.
Modern Paint and Coatings, Jul. 1991, pp. 46 and 48 Epoxy Water–Borne Primer: Low–Temp Cure and Zero VOCs.
Adhesives Age, Dec. 1991 pp. 24–26 Waterborne Epoxy Dispersions Provide Compliant Alternatives.
International Search Report for PCT/US93/08547 Dated: Dec. 17, 1993.

*Primary Examiner*—Melvyn I. Marquis
*Assistant Examiner*—D. Aylward
*Attorney, Agent, or Firm*—Michael J. Kelly; Claire M. Schultz; Bernard Lau

[57] ABSTRACT

Aqueous primer compositions containing substantially no volatile organic solvents, suitable for promoting the bonding of a metal adherend to a second adherend, are prepared by dispersing one or more solid epoxy resins and a solid curing agent into water such that the particle sizes of the solids are less than 30 μm. The primer compositions are environmentally superior to solvent based primers without loss of physical properties, are storage stable, and exhibit excellent solvent resistance.

11 Claims, No Drawings

5,461,090

AQUEOUS, ESSENTIALLY VOC-FREE ADHESIVE EPOXY PRIMER

This is a continuation of application Ser. No. 07/944,570, filed Sep. 14, 1992, now abandoned, incorporated herein by reference as if fully set forth.

BACKGROUND OF THE INVENTION

1. Field of the Invention

The subject invention pertains to aqueous primers for metal parts to which composite or metal adherends will be bonded utilizing structural adhesives. More particularly, the subject invention pertains to primers comprising aqueous dispersions of solid epoxy resins and solid curing agents which contain little or no volatile organic solvent.

2. Description of the Related Art

In the current manufacture of composite structures, particularly in the aerospace and transportation sectors, it is frequently necessary to bond a fabricated metallic structure to metal or composite adherends utilizing structural adhesives, generally structural film adhesives, or to laminate one or more plies of thermosetting resin impregnated fibrous reinforcement to the fabricated metal structure. In general, to ensure the greatest level of adhesive strength, the metal surface(s) are scrupulously cleaned of dirt, soil, grease, and metal oxidation products immediately prior to bonding. Unfortunately, this procedure cannot be generally used in a great portion of manufacturing, as the cleaning and bonding operations are often separated significantly in time. During this time period, the metal surface may become reoxidized, lessening the adhesive strength of the bond.

To overcome this difficulty, it has been proposed to prime the cleaned surface. Unfortunately, the primer may not permit the same degree of adhesion to either the metal surface(s) or composite adherends, and thus the resulting joint may not be as strong as that which could be achieved on a freshly prepared surface, although still superior to that which could be obtained from an oxidized surface. The primer must also be receptive to paint as well as adhesives.

Primers have often been prepared from one or two component thermosetting resins diluted to sprayable levels with organic solvents. Liquid epoxy esters were proposed for use in coatings by C. K. Thorstad, "Emulsions—Why and How They are Used", *Modern Plastics*, July 1959, pp. 83–84, in compositions containing either water or the epoxy ester itself as a vehicle, together with polyvinylacetate, polyacrylic, or poly(butadiene/styrene) lattices. Acid curing agents, for example dimethyl acid pyrophosphate or boron trifluoride are cited for these applications. However, the use of primers containing large amounts of volatile organic compounds (VOCs) is under increasing scrutiny for both toxicological and environmental reasons.

It has been proposed to utilize electrodepositable primers. Such primers contain resin particles bearing a charged group which migrate to an oppositely charged substrate from aqueous solution or dispersion. Such compositions often contain a lower but still undesirable level of VOCs and do not have ideal properties due to the restraints placed on the resin structure. Furthermore, the metal parts must be completely immersed in a tank of primer which impractical for large parts such as aircraft wings or fuselages. To be economical, such baths must be continually monitored and refreshed or must be reprocessed.

In U.S. Pat. No. 2,872,427 it has been proposed to utilize aqueous emulsions of liquid epoxy resins in textile treating. Additional suggested uses are in paints and enamels. The emulsions contain one or more emulsified liquid epoxy resins dispersed in an aqueous dispersing phase containing an alkali and acid stable non-ionic emulsifying agent and a water-dispersible binding colloid. For those applications where curing agents are also required, the curing agent is dissolved into the epoxy resin prior to dispersion. Such emulsions are storage stable with respect to sedimentation or coagulation, but suffer from the defect that since the epoxy and curing agent are intimately associated, premature curing may take place, particularly when exposed to elevated temperatures during shipment or storage. Shelf life of such emulsions is extremely limited. Furthermore, the protective colloids utilized are not themselves thermally stable, and may cause high temperature performance of the composition to suffer. Finally, such coatings suffer from lack of solvent resistance.

Raghavon and Lewis in the article "Epoxy Water-Borne Primer: Low-Temp Cure and Zero VOCs", *Modern Paint and Coatings*, July 1991, evidences the need for water-borne primers without VOCs and suggest use of an aqueous dispersion. However, no details of the composition suitable for such use are given.

U.S. Pat. No. 5,001,173 describes basecoats for metal surfaces which are to be latex primed and painted. The basecoat comprises an aqueous epoxy resin dispersion also containing chromium trioxide and preferably phosphoric acid. The use of aromatic amine or other solid epoxy curing agents is not disclosed. The basecoat is followed by a solvent borne primer containing substantial amounts of polyesters.

In the article "Guidelines to Formulation of Waterborne Epoxy Primers", M. A. Jackson, *Polymer Paint Colour Journal* 180 (4270) (1990) at pages 608–621 are described two component primer systems containing as one component an epoxy resin dispersion in water and solvent together with various corrosion inhibitors, and as the second component, a water reducible amine catalyst in water. Such formulations require mixing or metering of two separate components and are not storage stable.

In the article "Waterborne Epoxy Dispersions Provide Compliant Alternatives", R. Buehner et. al., *Adhesives Age*, December 1991, are described waterborne liquid and solid epoxy resin dispersions cured with dicyandiamide and water soluble 2-methylimidazole catalyst for use as adhesives. However, the shelf life of such dispersions is indicated as only greater than several days.

It would be an advance in the art to prepare a one-component aqueous adhesive primer which contains little or no VOCs; which is storage stable with respect to premature curing for extended periods of time when suitably stored (for example, for a period in excess of 24 weeks when stored at temperatures below 5° C., or for a period in excess of 3 months at ambient temperature); which allows for excellent adhesion of heat-curable resins to the metal substrate, preferably similar to that of a freshly cleaned metal surface; which can be easily and economically be prepared; and whose application to the substrate is practical and economical. These and other objects have been achieved by the use of an aqueous, non-ionic solid epoxy resin dispersion which contain as a distinct phase a solid epoxy curing agent, preferably in the substantial absence of any protective colloid.

DESCRIPTION OF THE PREFERRED EMBODIMENTS

The epoxy resins of the subject invention are conventional solid epoxy resins having functionalities of about 1.8 or more, preferably 2 or more, containing substantially no ionic or ester groups, as described in *Epoxy Resins*. Lee and Neville, McGraw-Hill, chapters 1 to 4. Preferred epoxy resins are the optionally chain-extended, solid glycidyl ethers of phenols such as resorcinol and the bisphenols, e.g. bisphenol A, bisphenol F, and the like. Also suitable are the solid glycidyl derivatives of aromatic amines and aminophenols, such as N,N,N',N'-tetraglycidyl- 4,4'-diaminodiphenylmethane. Preferred are the solid novolac epoxy resins and solid DGEBA resins. The epoxy resins must be solids themselves, or produce solid compositions when admixed with other epoxies.

Examples of suitable commercial epoxy resins are Epi-Rez® SU-8, a polymeric epoxy resin with an average functionality of about 8, melting point (Durran's) of 82° C., and an epoxy equivalent weight of 215 available from Rhone-Poulenc; DER 669, a high molecular weight solid epoxy resin having a Durran's softening point of 135°–155° C. and an epoxy equivalent weight of 3500–5500 available from the Dow Chemical Company; Epi-Rez® 522-C, a solid DBEGA epoxy having an epoxy equivalent weight of 550–650 and a Durran's melting point of 75°–85° C., available from Rhone-Poulenc; and ECN 1273, 1280, and 1299 orthocresolformaldehyde novolac solid epoxy resins having epoxy functionalities of from 3.8 to 5.4, epoxy equivalent weights of from 225 to 235, and melting points of from 73°–99° C., available from Ciba-Geigy. These resins may be supplied in solid form and ground to the correct particle size, or as an aqueous dispersion. For example, ECN-1299 is available as an aqueous dispersion from Ciba-Geigy as ECN-1440, and Epi-Rez® 522C from Rhone-Poulenc as 35201 epoxy dispersion.

Preferably, the epoxy resin dispersed phase comprises from 40 to about 10 percent by weight, and the aqueous continuous phase comprises from 60 to about 90 percent by weight, of the primers. The epoxy resin dispersed phase may comprise a dispersion of more than one epoxy resin as a mixture of distinct particles, or may consist of only one type of particle containing more than one epoxy resin. Thus a flexibilizing epoxy such as the higher molecular weight bisphenol A or bisphenol F epoxies may be blended with a highly temperature resistant epoxy such as TGMDA and the mixture cooled, ground, or otherwise dispersed into solid particles of the requisite size. These same epoxy resins might be advantageously dispersed separately without blending.

As indicated above, mixtures of epoxy resins are also suitable. A preferred mixture comprises a solid epoxy resin having a functionality of about 5.5 or less, and a solid epoxy resin having a functionality of about 6 or more. The use of higher functionality epoxy resins, i.e. epoxy resins having a functionality of five or more, in minor amounts is preferred, for examples less than 40 weight percent based on the sum of the weights of all epoxy resins in the composition. The use of such higher functionality epoxy resins in such minor amounts has been unexpectedly found to increase the solvent resistance of the cured primer without lowering adhesive properties substantially. A preferred high functionality epoxy resin is Epi-Rez® SU- 8, a polymeric solid epoxy resin having an average functionality of eight. Especially preferred is a mixture of:

1) from 30 to 70 weight percent of a solid epoxy resin having a functionality of from about 1.8 to about 4 and an epoxy equivalent weight of from about 400 to about 800;

2) from 5 to 20 weight percent of a solid epoxy resin having a functionality of from about 1.8 to about 4 and an epoxy equivalent weight of from about 2000 to about 8000; and 3) from 10 to 40 weight percent of a solid epoxy resin having a functionality of about 5 or more and having an epoxy equivalent weight of from about 100 to about 400, the weight percents totalling 100 percent based on total weight of the epoxy mixture.

The curing agents of the subject invention are preferably substantially water insoluble, and are solids at room temperature. Examples of such curing agents are aromatic amine curing agents such as 4,4'-diaminodiphenylmethane, and in particular, 3,3'- and 4,4'-diaminodiphenylsulfone. Further suitable are 3,3'- and 4,4'-diaminodiphenyloxide, 3,3- and 4,4'-diaminodiphenyloxide, 3,3'- and 4,4'-diaminodiphenylsulfide, and 3,3'- and 4,4'-diaminodiphenylketone. Most preferred as a curing agent is 4,4'-[1,4-phenylene(1-methylethylidene)]-bis(benzeneamine). Also suitable are the amino and hydroxyl terminated polyarylene oligomers wherein the repeating phenyl groups are separated by ether, sulfide, carbonyl, sulfone, carbonate, or like groups. Examples of such curing agents are the amino-and hydroxyl-terminated polyarylenesulfones, polyaryleneethersulfones, polyetherketones, polyetheretherketones, and like variants.

Other suitable solid diamine curing agents include 2,4-toluenediamine, 1,4-phenylenediamine, 2,2-bis(4-aminophenyl)hexafluoropropane, 2,2-bis(3-amino- 4-hydroxyphenyl)hexafluoropropane, 3,4'-diaminodiphenyloxide, 9,9-bis(4-aminophenyl)fluorene, o-toluidine sulfone, and 4,4'-diaminobenzanilide. Particularly also preferred are 9,10-bis(4-aminophenyl)anthracene, 2,2-bis(4-[ 3-aminophenoxy]phenyl)sulfone, 2,2-bis(4-[4-aminophenoxy]phenyl)sulfone, 1,4-bis( 4-aminophenoxy)biphenyl, bis(4-[4-aminophenoxy)phenyl)ether, 2,2-bis(4-[ 4-aminophenoxy]phenyl)propane, and 2,2-bis([4-(4-amino-2-trifluorophenoxy)]phenyl)hexafluoropropane. Most preferably, those solid amine curing agents having melting points below 250° F., preferably below 220° F. are utilized.

Catalysts are generally unnecessary; however, solid, water dispersible catalysts may be added when the particular curing agent is not sufficiently active at the primer bake temperature to effect cure of the primer. The catalyst should be substantially water insoluble, and in particulate form having a particle size such that essentially 100 percent of the particles have mean diameters less than about 30 μm.

Volatile organic solvents are undesirable and generally unnecessary. However, it would not depart from the spirit of the invention to employ a most minor portion of such a solvent, i.e. less than 1–2% by weight. Examples of volatile organic solvents which could be added without affecting the function and physical properties of the composition include the low molecular weight glycols and glycol ethers, N-methylpyrrolidone, and similar solvents. By the term "substantially solvent free" is meant that the system contains no volatile organic solvent or such a minor portion that substantially no advantage or difference can be ascertained between the cured physical properties obtained from the completely solventless system and the system containing the minor amount of solvent.

The compositions of the subject invention may include tougheners useful in adhesive systems, for example elastomers, preferably reactive elastomers such as those containing anhydride, epoxy, amino, or hydroxyl functionality. If the elastomer is a liquid elastomer such as the liquid rubbers sold under the trade name HYCAR, then the elastomer must first be reacted with epoxy resin, either a solid or liquid epoxy, to form a prereact chain-extended elastomer which is a solid. The solid prereact may then be ground or milled to particle sizes less than 30 μm, preferably less than 20 μm, and most preferably such that the majority of particles are in the 2–5 μm range or below. If the elastomer is solid, then it may be ground cryogenically if not supplied in the appropriate size range. Whether formed as a prereact or already in solid form, the elastomer is then dispersed with the remaining ingredients.

The amounts of elastomer are not overly critical, but amounts of from 1 to about 30 weight percent, preferably from about 5 to about 15 weight percent based on total primer solids are adequate. The addition of elastomer to the primer composition, while increasing certain of the cured adhesive's physical properties, particularly peel strength, has the effect of decreasing solvent resistance is required, and thus where solvent resistance for a particular application, the use of elastomers as described herein should be avoided.

The composition may also contain dyes, pigments, leveling agents, additional dispersing agents, thickeners, and the like, although these are generally unnecessary. A benefit of compositions containing dyes or pigments is that surface coverage can be assessed more easily by visual methods. Certain types of pigments may also serve as anti-corrosion additives. Examples of the latter are various salts such as strontium chromate, barium chromate, zinc chromate, and lead chromate, and in particular, the various iron oxides, most preferably the "transparent iron oxides", so-called because of their small particle size.

Suitable corrosion inhibitors are known in the art. Preferred are the metal chromates, for example strontium and barium chromate, and zinc chromate. Amounts of metal chromates of from about 0.3 weight percent to about 5 weight percent are practical. The composition may also contain non-chromate corrosion inhibitors. An preferred example of the latter is SICORIN RZ available from BASF AG, Ludwigshafen, Germany. Amounts of the latter suitable are from about 0.125 weight percent to about 5 weight percent. Further suitable are corrosion inhibitors such as zinc phosphate and zinc molybdate.

The dispersions are generally prepared by first dispersing the solid epoxy resin(s) or blend of solid epoxy resins into the aqueous vehicle. The epoxy resins may be heated to above their melting point or dissolved in a solvent to form a concentrated solution, the solvent being later removed by distillation or stripping. Preferably no solvent is utilized. The resultant liquid epoxy resin or epoxy resin solution is dispersed into water by its slow addition under high shear agitation; by forcing the epoxy through metal plates containing numerous micron sized holes into rapidly agitated water; or by like methods well-known to those or ordinary skill in the art. Finely ground solid epoxy resins may be utilized instead of molten, normally solid epoxy resins. To aid in the maintenance of a stable dispersion, an effective amount of a surfactant may be added. Such surfactants contain both hydrophilic and hydrophobic (lipophilic) portions and include the simple soaps such as the sodium and ammonium salts of long chain fatty acids, long chain fatty alcohol ethoxylates, alkylphenol ethoxylates or block polyoxyalkylene polyethers containing a hydrophobic moiety derived from repeating polyoxypropylene or polyoxybutylene groups or one or more long chain olefin oxide reaction products and a hydrophilic group comprising repeating oxyethylene groups.

Because such surfactants are not generally stable at high temperatures, and because their presence may enhance water absorption by the cured primer, the minimum amount of surfactant should be used. Commercial dispersions of epoxy resins often contain a minor amount of surfactant. If the dispersion of epoxy coagulates or coalesces, then addition of measured amounts of surfactant to freshly prepared dispersions or to the aqueous phase preparatory to formation of the dispersion can be used to assess the stability of the dispersion. Most preferably, the dispersion will be stable with regards to sedimentation of the epoxy resin dispersed phase. However, in the context of the subject invention, the term "stable" refers to a dispersion where the epoxy resin particles do not coalesce or coagulate, but remain substantially in distinct particles. If such particles sediment upon storage, they may be easily redispersed by shaking or moderate agitation. If, however, the particles coalesce, they will be incapable of redispersement without high shear mixing for prolonged periods of time.

To avoid the necessity of dispersing the epoxy resins, commercially available dispersions may be utilized to supply certain of the epoxy resin ingredients. Such dispersions are available from a number of manufacturers, for example from Ciba-Geigy as ECN-1400, a dispersion of epoxy novolac ECN 1299 in water; and Epi-Rez® 35201, a dispersion of a solid DGEBA epoxy resin, CMD W50-3519, an elastomer modified epoxy dispersion, and W55-5003, an SU-3 epoxy dispersion, all available from Rhone-Poulenc. In any case, the particle size of the epoxy resin should be such that essentially 100 percent of the particles have sizes less than 30 μm, preferably less than 20 μm. Best results are obtained with essentially 100 percent of the particles being less than 16 μm, with 90 percent less than 2 μm. Such particles sizes may be obtained by the methods previously described, or by traditional grinding methods such as jet milling, ball milling, or sand milling.

Following dispersion of the epoxy resin(s) into the aqueous phase, the curing agent is added. The curing agent is first reduced to a fine particle size, preferably of less than 0.1 μm to about 30 μm, and more preferably from about 1 μm to about 10 μm, in diameter, whereby essentially 100 percent of the particles have mean diameters less than 30 μm. In general, the finer the particle size, the more dispersible the primer will be, and also the more resistant to sedimentation. In addition, small particle sizes such as these have been unexpectedly found to increase solvent resistance of the cured primer. The particle sizes herein are measured with a Brinkmann Particle Size Analyzer based on probability number density.

The curing agent may be also reduced to small particle size by known methods, including spray drying, solution precipitation, ball milling, sand milling, air jet milling, and the like. The fine curing agent particles are added to the epoxy emulsion or dispersion and agitated until a uniform mixture is obtained. Following or preceding addition of the curing agent, other additives such as dyes, pigments, corrosion preventatives, and the like, may be added.

Amine to epoxy stoichiometry may range from about 0.5 to about 1.5. However, if maximum solvent resistance is desired, the amine/epoxy ratio should be from about 0.8 to about 1.5, preferably about 1.0. Solvent resistance is assessed by wiping with methylethylketone solvent twenty times after the primer is cured. Acceptable solvent resistance is shown when following 20 wipes there is negligible visible damage to the film, i.e. the film is still intact and of substantially the same thickness as initially. There should be little or not loss of polymer from the cured film.

The low VOC primer is applied by traditional methods, for example by air driven or airless spray guns, by high volume low pressure spray guns, and the like, for example a Binks model 66 spray gun. Following drying, the finish is baked at a temperatures sufficient to the cure the coating. Nominal curing temperatures range from 100°–200° C., preferably 100°–175° C., and most preferably at about 115°–125° C. Cure time is dependent upon cure temperature and can be, for example from about 0.5 to about 4 hours. Preferably, the primer is cured at about 120° C. for one hour. Nominal cured coating thickness is from 0.02 to 1.0 mils (0.5 to 25.4 μm), preferably from 0.05 to 0.5 mils (1.3 to 12.7 μm), and especially from 0.05 to 0.25 mils (1.3 to 6.4 μm). Surprisingly, even though the epoxy resin and curing agent are in distinct phases, the coatings produced are of exceptionally high quality.

Once the primer has been applied to a substrate, such as a metal adherend, a second adherend, such as a second metal substrate or a composite substrate, can be adhered to the so-primed substrate in a normal manner by positioning a thermosettable adhesive between the primed surface of the substrate and the second adherend, then applying heat and pressure such as to cure thermosettable adhesive. Thermosettable adhesives suitable for a particularly application, as well as the suitability for such application and curing conditions thereof, are well-known to those of ordinary skill in the art.

In a similar manner, composite metal/resin articles can be formed by applying a crosslinkable resin onto the primed surface of metal substrate, then curing the crosslinkable resin. A wide variety of well-known crosslinkable resins may be suitable for forming such composite metal/resin articles. Such crosslinkable resins may be in the form, for example, of a paint or laminate, and may further incorporate a wide variety of additives well-known for a particular application. As one such additive may be mentioned fibrous reinforcements. The invention will now be illustrated by reference to the following examples.

EXAMPLE 1

A primer formulation was prepared by dispersing the following ingredients, in parts by weight.

| | |
|---|---|
| Epi-Rez ® SU-8 epoxy resin[1] | 1.85 |
| DER 669 epoxy resin[2] | 2.10 |
| Cabosil ® | 0.3 |
| Epi-Rez ® 35201[3] | 17.0 |
| Epon HPT Curing Agent 1061-M[4] | 2.1 |
| Pigment | 1.0 |
| Corrosion Inhibitor | 1.6 |
| Water | 70.0 |

[1]Product of Rhone-Poulenc, a solid epoxy resin having a functionality of c.a. 8, and a EEW of 215.
[2]Product of Dow Chemical Co., a bisphenol A based solid epoxy having an EEW of 350°–5500 and a softening point of from 135–155° C.
[3]A water dispersion of a solid bisphenol A epoxy resin having a viscosity of 12000 cps at 25° C. and 60 percent solids, available form Rhone-Poulenc.
[4]4,4'-[1,4-phenylene(l-methylethylidene)]-bis(benzeneamine), available from Shell Chemical Co.

EXAMPLES 2–4

A primer formulation was prepared by dispersing the following ingredients, ground to particle sizes such that 100% were below 20 μm, into water.

| | Example 2 | Example 3 | Example 4 |
|---|---|---|---|
| RD 90-027 | 100.0 | 100.0 | 100.0 |
| DER 669/Hycar CTBN | — | — | 5.5 |

-continued

| | Example 2 | Example 3 | Example 4 |
|---|---|---|---|
| Paraloid 2691 | 6.0 | 6.0 | 6.0 |
| Pigment | 4.0 | 4.2 | 8.0 nominal |
| 4,4'-diaminodiphenyl-sulfone | 2.0 | 5.0 | — |
| HPT 1061-M | — | — | 5.5 |
| Cabosil M5 | 1.0 | 1.0 | — |
| Curezol C17Z[1] | 0.5 | — | — |
| Water (deionized) | 100.0 | 108.0 | 139.0 |

[1]2-heptadecyl-1H-imidazole

Primers were coated onto metal adherends and showed acceptable performance when tested for Bell peel strength and lap shear strength. All showed acceptable corrosion resistance. However, solvent resistance (MEK) was found to be in need of improvement.

EXAMPLE 5

A primer composition was made as in examples 1–4, having the following compositions in weight percent.

| | |
|---|---|
| Epirez ® SU-8 | 4.0 |
| DER 669 | 2.2 |
| WD-35201 | 9.0 (based on resin solids) |
| HPT-1061 | 2.6 |
| Cabosil M5 | 0.35 |
| SrCrO$_4$ | 0.24 |
| BaCrO$_4$ | 1.4 |
| Deionized Water | 80.0 |

This formulation, when cured, showed excellent solvent resistance.

EXAMPLES 6–7

Similar to Examples 1–5 primers were prepared having the following compositions.

| | Example 6 | Example 7 |
|---|---|---|
| WD 35201 | 14.78 | 14.78 |
| DER 669 | 2.16 | 2.16 |
| SU-8 | 3.71 | 3.71 |
| HPT 1061-M | 2.67 | 2.67 |
| Cabosil M5 | 0.36 | 0.36 |
| SrCrO$_4$ | 0.23 | — |
| BaCrO$_4$ | 1.35 | — |
| Paleotol ® Yellow | 0.29 | — |
| Heilogen ® green | — | 0.29 |
| SICORIN RZ | — | 1.58 |
| Deionized Water | 74.45 | 74.45 |

These formulations were used to prime 2024 T3 aluminum adherends and cured at 250° F. (121° C.) for one hour, following which the adherends were bonded with a variety of structural adhesives, cured and tested as indicated in Tables 1 to 5. In these tables, "Non-Chromated" refers to the primer of Example 7 while "chromated" refers to the primer of Example 6. "No Prime" indicates that no primer was used. "Solvent" indicates that a solvent based primer was utilized for comparison purposes.

The tables indicate that use of the aqueous primer compositions of the subject invention perform their function well, promoting bonding between adherends with the aid of structural adhesives which compare well to bond properties obtained from freshly prepared metal surfaces. The bond properties also exceed those obtained from solvent based primers, particularly with respect to 250° F. (121° C.) wet lap shear strength.

Bell peel specimens for FM 300 and FM 400 had bond line thicknesses of 0.010 inches (0.254 mm). Metlbond® 1146 adhesive bond line thickness was measured at 0.006 inches (0.152 mm). Cross Head test speed was 6 inches/minute (152 mm/minute). All primed specimens were sprayed with one box coat to yield a cured primer thickness of 0.15 to 0.2 mils (3.6 to 5.1 μm). AF163 is from 3M Company.

TABLE I

LAP SHEAR PERFORMANCE

| LAP SHEAR DATA lbs/in$^2$ ($\times 10^7$ N/m$^2$) | −67° F. (−55° C.) | RT | 250° F. (121° C.) | 75° F. (24° C.) WET (2) | 350° F. (177° C.) | 420° F. (216° C.) |
|---|---|---|---|---|---|---|
| ADHESIVE/PRIMER | | | | | | |
| METLBOND®$^1$ NO PRIME | 6254 (4.31) | 5797 (4.00) | 3638 (2.51) | 5798 (4.00) | | |
| METLBOND® NON-CHROMATED | 6154 (4.24) | 6679 (4.60) | 3471 (2.39) | 5747 (3.96) | | |
| METLBOND® CHROMATED | 6453 (4.45) | 6842 (4.72) | 3558 (2.45) | 5934 (4.09) | | |
| FM300$^2$ NO PRIME | 5465 (3.77) | 5207 (3.59) | 3734 (2.57) | 5747 (3.96) | | |
| FM300 CHROMATED | 4709 (3.25) | 5727 (3.95) | 3472 (2.39) | 6023 (4.15) | | |
| FM400$^2$ NO PRIME | 4123 (2.84) | 4267 (2.94) | | 3397 (2.34) | 2987 (2.06) | 2136 (1.47) |
| FM400 CHROMATED | 4171 (2.86) | 4046 (2.79) | | 3377 (2.33) | 2131 (1.47) | 1776 (1.22) |

(1)Indicates 30-Day Exposure Requirement. Lap shear specimens had average bond line thicknesses measuring 0.005 inches (0.13 mm). Cross Head test rate was 0.05 inches/minute (1.3 mm/min). All primed specimens were sprayed with one box coated to yield a cured primer thickness of 0.15 to 0.2 mils (3.6 to 5.1 μm).
(2)Accelerated exposures (72-hour water boil) were run to give an indication of wet primer performance.
$^1$Metlbond® 1146 structural adhesive available from BASF Structural Materials, Inc.
$^2$FM 300 and FM 400 structural adhesives available from American Cyanamid Co.

TABLE 2

BELL PEEL PERFORMANCE

| BELL PEEL in-lbs/in (m-N/m) | −67° F. (−55° C.) | RT | 250° F. (121° C.) |
|---|---|---|---|
| ADHESIVE/PRIMER | | | |
| METLBOND® 1146 NO PRIME | 28 (124.5) | 62 (275.8) | 59 (262.4) |
| METLBOND® 1146 NON-CHROMATED | 34 (151.2) | 57 (253.5) | 58 (258.0) |
| METLBOND® 1146 CHROMATED | 32 (142.3) | 58 (258.0) | 57 (253.5) |
| FM 300 NO PRIME | 29 (129.0) | 41 (182.4) | 40 (177.9) |
| FM 300 CHROMATED | 25 (111.2) | 41 (182.4) | 39 (173.5) |
| FM 400 NO PRIME | 8.0 (35.6) | 8.0 (35.6) | NOT REQUIRED |
| FM 400 NON-CHROMATED | 16 (71.2) | 17 (75.6) | NOT REQUIRED |
| FM 400 CHROMATED | 14 (62.3) | 14 (62.3) | NOT REQUIRED |
| AF163 NO PRIME | 75 (333.6) | 79 (351.4) | NOT REQUIRED |
| AF163 CHROMATED | 67 (298.0) | 80 (355.8) | NOT REQUIRED |

TABLE 3

TEST RESULTS
SOLVENT BASED PRIMER TO WATER BASED PRIMER

| | BELL PEEL in-lb/in (m-N/m) | | | LAP SHEAR lbs/in² (× 10⁷ N/m²) | 250° F. |
|---|---|---|---|---|---|
| PRIMER | −67° F. (−55° C.) | 75° F. (29° C.) | 250° F. (121° C.) | 75° F. (29° C.) | (121° C.) WET |
| NO PRIME | 35 (155.7) | 58 (258.0) | 55 (244.6) | 6470 (4.46) | 2141 (1.48) |
| SOLVENT | — | 63 (280.2) | 47 (209.1) | 6320 (4.36) | 470 (0.32) |
| CHROMATED | 32 (142.3) | 63 (280.2) | 52 (231.3) | 6330 (4.36) | 2130 (1.47) |

PRIMER RESULTS SPRAY COATED AT OR NEAR 0.1 MIL (2.5 μm), BONDED WITH METLBOND® 1146 ADHESIVE.

Primer Cured at 250° F. (121° C.), 60 Min.
Bonded with Metlbond® 1146 Adhesive, Cured at 350° F. (1.72° C.), 90 min., 35 psi (2.41×10⁵ N/m²).

TABLE 4

PEEL VERSUS CHROMATED PRIMER THICKNESS

| | SHEAR lbs/in² (× 10⁷ N/m²) | | PEEL in-lb/in (m-N/m) | |
|---|---|---|---|---|
| | 75° F. (29° C.) | 250° F. (121° C.) | 75° F. (29°) | −67° (−55° C.) |
| NO PRIME (CONTROL) | 6700 (4.62) | 2300 (1.56) | 81 (360.3) | 35 (155.7) |
| 1 BOX COAT (0.05 MILS) (1.27 μm) | 7000 (4.83) | 2800 (1.93) | 84 (373.6) | 40 (177.9) |
| 2 BOX COATS (0.1 MILS) (2.54 μm) | 6600 (4.55) | 3000 (2.07) | 82 (364.7) | 41 (182.4) |
| 4 BOX COATS (0.2 MILS) (5.08 μm) | 6400 (4.41) | 2900 (2.00) | 82 (364.7) | 42 (186.8) |
| 6 BOX COATS (0.25 MILS) (6.35 μm) | 6900 (4.76) | 3000 (2.07) | 78 (346.9) | 36 (160.1) |

(19% Solids, Binks Model 66 Spray Gun).
2024 T3 Al, FPL, etch, PAA.

TABLE 5

CHROMATED PRIMER WITH 250° F. OR 350° F. ADHESIVES

| | BELL PEEL in-lb/in (m-N/m) | | | LAP SHEAR lbs/in² (× 10⁷ N/m²) | | | |
|---|---|---|---|---|---|---|---|
| | −67° F. (−55° C.) | RT | 250° F. (121° C.) | −67° F. (−55° C.) | RT | 250° F. (121° C.) | 250° F. (121° C.) WET |
| 350° F. CURE[1] (177° C.) | | | | | | | |
| NO PRIME | 34 (151.2) | 73 (324.7) | 64 (284.7) | 6190 (4.27) | 6373 (4.39) | 3310 (2.28) | 970 (0.67) |
| CHROMATED | 29 (129.0) | 74 (329.2) | 61 (271.3) | 6290 (4.34) | 6505 (4.49) | 2640 (1.82) | 1060 (0.73) |
| 250° F. CURE[1] (121° C.) | | | | | | | |
| NO PRIME | 24 (106.8) | 61 (271.3) | 55 (244.6) | 6405 (4.42) | 6535 (4.51) | 3475 (2.40) | 2130 (1.47) |
| CHROMATED | 32 (142.3) | 63 (280.2) | 52 (231.3) | 5745 (3.96) | 6330 (4.36) | 3380 (2.33) | 2130 (1.47) |

TABLE 5-continued

| CHROMATED PRIMER WITH 250° F. OR 350° F. ADHESIVES | | | | | | |
|---|---|---|---|---|---|---|
| BELL PEEL in-lb/in (m-N/m) | | | LAP SHEAR lbs/in² (× 10⁷ N/m²) | | | |
| −67° F. (−55° C.) | RT | 250° F. (121° C.) | −67° F. (−55° C.) | RT | 250° F. (121° C.) | 250° F. (121° C.) WET |
| 250° F. CURE (121° C.) | | | | | | |
| AF 163 NO PRIME | 75 (333.6) | 79 (351.4) | | 7175 (4.95) | 6745 (4.65) | 180° F. (82° C.) 3415 (2.35) | 180° F. (82° C.) WET 2040 (1.41) |
| CHRO-MATED | 67 (298.0) | 80 (355.8) | | 6895 (4.75) | 6545 (4.51) | 3445 (2.38) | 1983 (1.37) |

2024T3 A1, FPL etch, PAA. Primed at 0.2 mils (5.08 μm), cure 60 min. 250° F. (121° C.) Bonded and Cured at 250° F.(121° C.) or 350° F. (177° C.) as indicated, 90 min., 35 psi (2.41 × 10⁵ N/m²).
¹Metlbond ® 1146 adhesive.

I claim:

1. A one component, substantially volatile organic solvent free primer composition, comprising an aqueous dispersion of:

a) one or more non-ionic, particulate epoxy resins having a particle size such that essentially 100 percent of said resin particles have mean diameters less than about 30 μm;

b) a solid, particulate curing agent selected from the group consisting of solid aromatic diamines having particle sizes such that essentially 100 percent of said curing agent particles have mean diameters less than about 30 μm;

such that the amine to epoxy stoichiometry ratio is greater than 0.5, wherein said aqueous dispersion is chemically storage stable, and wherein said composition when cured exhibits resistance to organic solvents.

2. The primer composition of claim 1 wherein said epoxy resin is a mixture of epoxy resins comprising:

a)i) a solid epoxy resin having an epoxy functionality of about 5.5 or less, and a)ii) a solid epoxy resin having an epoxy functionality of 6 or more.

3. The primer composition of claim 1 wherein said aromatic amine curing agent is selected from the group consisting of 4,4'-diaminodiphenylsulfone, 3,3'-diaminodiphenylsulfone, 4,4'-diaminodiphenylketone, and 4,4'-[1,4-phenylene(1-methylethylidene)]bis(benzeneamine).

4. The primer composition of claim 2 wherein said aromatic amine curing agent is selected from the group consisting of 4,4'-diaminodiphenylsulfone, 3,3'-diaminodiphenylsulfone, 4,4'-diaminodiphenylketone, and 4,4'-[1,4-phenylene(1-methylethylidene)]bis(benzeneamine).

5. The primer composition of claim 1 wherein the dispersed phase of said dispersion comprises from 40 to about 10 percent by weight of said dispersion and the aqueous continuous phase comprises from 60 to about 90 percent by weight of said dispersion, and wherein the epoxy resin comprises, based on the total weight of the epoxy resin:

1) from 30 to 70 weight percent of a solid epoxy resin having an epoxy functionality of from 1.8 to about 4 and an epoxy equivalent weight of from 400 to 800;

2) from 5 to about 20 weight percent of a solid epoxy resin having an epoxy functionality of from 1.8 to about 4 and an epoxy equivalent weight of from about 2000 to about 8000; and;

3) from 10 to about 40 weight percent of a solid epoxy resin having an epoxy functionality of 5 or more and having an epoxy equivalent weight of from about 100 to about 400, said weight percents totalling 100 percent based on total weight of the epoxy component.

6. The primer composition of claim 3 wherein the dispersed phase of said dispersion comprises from 40 to about 10 percent by weight of said dispersion and the aqueous continuous phase comprises from 60 to about 90 percent by weight of said dispersion, and wherein the epoxy resin comprises, based on the total weight of the epoxy resin:

1) from 30 to about 70 weight percent of a solid epoxy resin having an epoxy functionality of from 1.8 to about 4 and an epoxy equivalent weight of from 400 to 800;

2) from 5 to about 20 weight percent of a solid epoxy resin having an epoxy functionality of from 1.8 to about 4 and an epoxy equivalent weight of from about 2000 to about 8000; and;

3) from 10 to about 40 percent of a solid epoxy resin having an epoxy functionality of 5 or more and having an epoxy equivalent weight of from about 100 to about 400, said weight percents totalling 100 percent based on total weight of the epoxy component.

7. The primer compositions of claim 1, further comprising an effective amount of a catalyst which promotes the cure of epoxy resins, said catalyst being a solid catalyst in particulate form having a particle size such that essentially 100 percent of said particles have mean diameters less than about 30 μm.

8. The primer composition of claim 1 wherein said epoxy resins contain substantially no ester groups.

9. The primer composition of claim 3, wherein said aromatic amine curing agent is 4,4'-diaminodiphenylsulfone.

10. The primer composition of claim 4, wherein said aromatic amine curing agent is 4,4'-diaminodiphenylsulfone.

11. The primer composition of claim 1, substantially absent of any protective colloid.

* * * * *